US010803486B1

(12) United States Patent
Dalen et al.

(10) Patent No.: US 10,803,486 B1
(45) Date of Patent: Oct. 13, 2020

(54) ITEM RECOMMENDATIONS BASED ON MEDIA CONTENT

(71) Applicant: Amazon Technologies, Inc., Reno, NV (US)

(72) Inventors: Dustin Michael Dalen, Issaquah, WA (US); Amy Marie Bergsieker, Seattle, WA (US); Ryan Clark, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 14/261,297

(22) Filed: Apr. 24, 2014

(51) Int. Cl.
*G06Q 30/02* (2012.01)
*G06Q 30/06* (2012.01)

(52) U.S. Cl.
CPC ..... *G06Q 30/0255* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 6,886,036 B1* | 4/2005 | Santamaki | ............ | G06F 16/10 709/223 |
| 7,610,382 B1* | 10/2009 | Siegel | ................ | G06F 17/2264 704/10 |
| 8,234,218 B2* | 7/2012 | Robinson | ............ | G06F 3/04815 705/14.23 |
| 8,255,512 B2* | 8/2012 | Chang | .................... | H04L 29/06 709/223 |
| 8,712,937 B1* | 4/2014 | Bacus | .................... | G06F 16/35 706/20 |
| 8,756,276 B2* | 6/2014 | Tseng | ................. | G06Q 30/0255 705/14.49 |
| 2009/0251440 A1* | 10/2009 | Edgecomb | .......... | G06F 3/03545 345/179 |
| 2011/0082724 A1* | 4/2011 | Le Chevalier | ......... | G06Q 30/02 705/14.4 |
| 2012/0110509 A1* | 5/2012 | Isozu | .................... | G06Q 30/02 715/830 |
| 2012/0311438 A1* | 12/2012 | Cranfill | ............... | G06Q 20/123 715/256 |
| 2013/0076771 A1* | 3/2013 | Bachman | ........... | G06Q 30/0643 345/581 |
| 2014/0032325 A1* | 1/2014 | Weiss | ................. | G06Q 30/0261 705/14.58 |
| 2015/0213515 A1* | 7/2015 | Fernandez-Ruiz | ......................... G06Q 30/0277 705/14.49 |

\* cited by examiner

*Primary Examiner* — Michael J Sittner
(74) *Attorney, Agent, or Firm* — Kilpatrick Townsend & Stockton LLP

(57) ABSTRACT

Techniques for providing a recommendation or advertisement for an item associated with media content are provided. In some embodiments, the recommendation or advertisement may be associated with an item that the user is interacting with at a particular time. Metadata associated with the media content can be analyzed to identify the item and the recommendation or advertisement may be provided more often based in part on how recently the user interacts with the item in the media content.

16 Claims, 7 Drawing Sheets

ITEM RECOMMENDATIONS BASED ON MEDIA CONTENT

BACKGROUND

Consumers receive advertisements and recommendations for items all the time. Item providers, manufacturers, other consumers, friends, and media entities all advertise or recommend items. When these advertisements are relevant for the consumer, the consumer may order the item, but advertisements are not always relevant or interesting for the consumer, which can make them ineffective.

BRIEF DESCRIPTION OF THE DRAWINGS

Various embodiments in accordance with the present disclosure will be described with reference to the drawings, in which.

DETAILED DESCRIPTION

Figure 1:
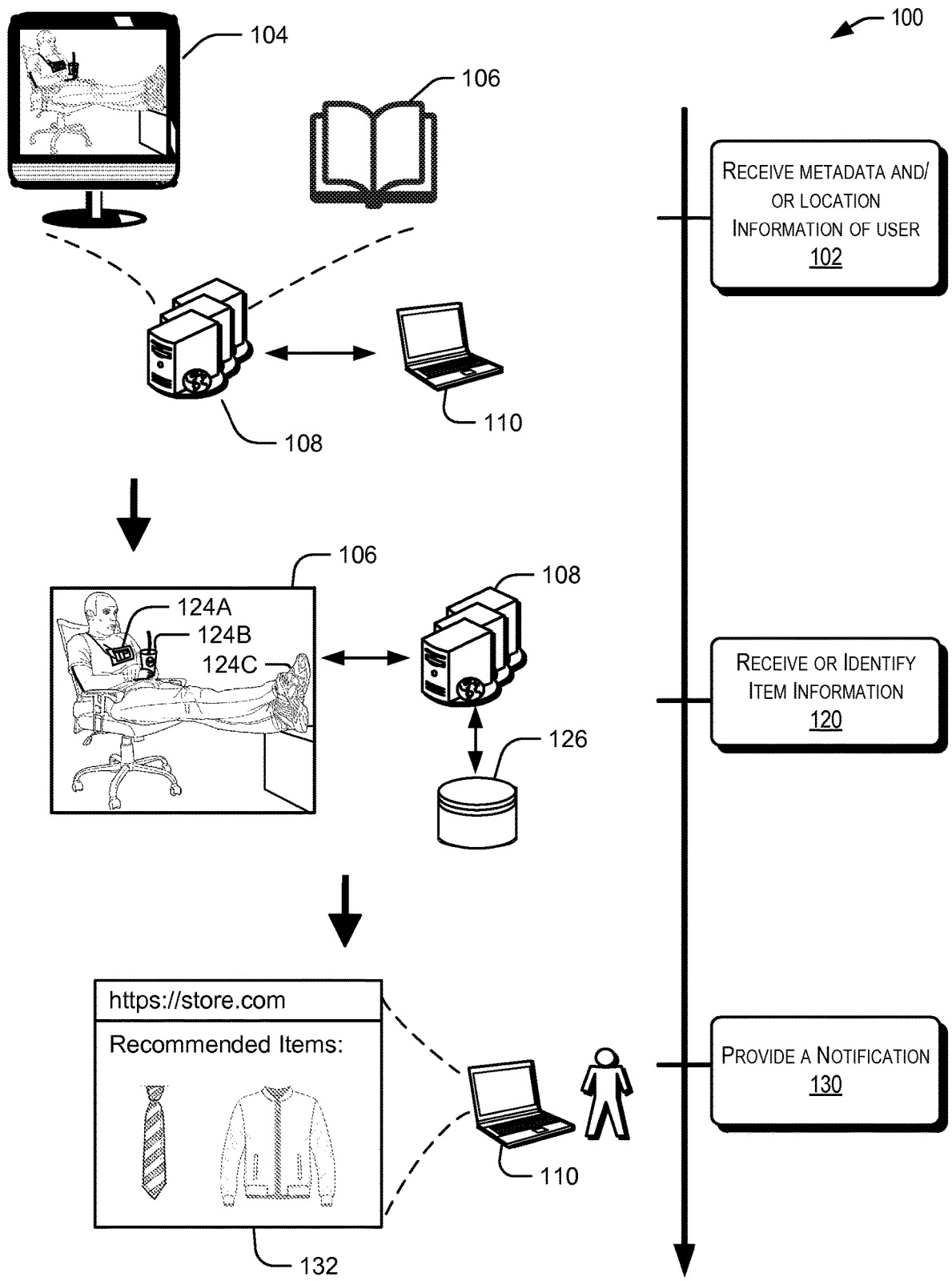
FIG. 1 illustrates an illustrative flow for providing a notification described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing a notification to a user. In particular, the notification can include a recommendation or advertisement for an item associated with media content that the user is interacting with at a particular time. Metadata associated with the media content can be analyzed to identify the item and the recommendation or advertisement may be provided more often based in part on how recently the user interacts with the item in the media content.

In a non-limiting example, a user receives an electronic book on an e-reader computing device. The user reads through the book until page 30 of the book, which describes a particular jacket that one of the main characters in the book is wearing. The identification of the item at page 30 is received by a computer system, so that the computer system can provide an advertisement or recommendation for the jacket to the user. In some examples, the advertisement or recommendation may be a link to the item offered through an electronic marketplace (e.g., via a network page that offers the item to the user). The user can browse to the electronic marketplace to order the item that the user encountered in the book.

Media content can include one or more messages (e.g., audio, visual, etc.) that are produced to be delivered to users. For example, media content can include electronic books, magazines, journals, articles, audio (e.g., songs, news reports, etc.), streaming audio or video, movies, shows, commercials, conversations (e.g., recorded, observed, etc.), video games, image frames, software applications (e.g., apps), or sporting events. Media content can be provided through computing devices (e.g., e-readers, tablets, televisions, handheld devices, personal computers, or other devices known in the art) that are operated by users to access the media content.

Metadata can include information associated with the media content, user, and/or computing device. For example, metadata can include item information for one or more items included in the media content. In other examples, metadata can include media content information about the media content (e.g., information about the book, magazine, streaming video, etc.), items discussed or displayed by the media content (e.g., an item shown in a television show or movie, an item that the main character in a book wears on an adventure, etc.), information contained in at least a portion of a script and/or closed captioning text associated with the media content (e.g., a character in a movie talks about a particular brand of jacket), item information for items associated with topics discussed during conversations, items displayed by a movie, show, video game, etc.

Location information can identify a location in the media content that the user is interacting with at a particular time. For example, if the user is at page 30 of a book, the location information may include "page 30." In another example, the location information can include a particular time that the user arrived or left the location of the media content (e.g., started page 30 on January $1^{st}$), metadata, or a duration of time that the user has interacted with the location (e.g., remained on page 30 for 15 minutes). For other types of media content, the location information can include a timestamp in the movie, show, or commercial (e.g., the user is at 1 minute 30 seconds of a 20-minute movie). In some examples, the location information can be relative to the media content (e.g., the user is at the "beginning" or "middle" of the book) or provided as a message to the user through a computing device.

An item can be an item offered for purchase, bid, auction, distribution, or otherwise provided in an electronic environment. For example, the item can be an article of clothing (e.g., jacket, tie, shirt, etc.) offered for purchase through an item provider's network page. In another example, the item can be a vacation package offered for auction through an electronic marketplace. The item may be associated with item information, which can include any relevant information about the item. For example, item information can include a brand, item manufacturer, item provider, price, image of the item, item category (e.g., electronics, toys, travel, etc.), or other information used to describe or identify the item.

A notification can include a message provided to the user about an item. For example, the notification may be an image or description of the item on a network page (e.g., the item shown in a list of recommended items in an electronic marketplace). The notification can be provided through the network page accessed by the computing device operated by the user. In other examples, the notification may be incorporated with other network pages or software applications (e.g., an unimposing image of the item in the corner of a page of an electronic book).

FIG. 1 illustrates an illustrative flow for providing a notification described herein, according to at least one example. In a non-limiting example, the method 100 can receive metadata and/or location information of a user 102. For example, a movie 104 or electronic book 106 can be provided by a computer system 108 to a computing device 110 of a user. The movie or book may be examples of media content. The media content can include descriptions or images of one or more items in metadata associated with the media content.

The method 100 may receive or identify item information 120. For example, the movie 104 may include a character that is associated with one or more items. The items can include a variety of objects, for example, the character may be wearing a t-shirt 124A with a brand or symbol on the t-shirt, drinking a particular type of drink 124B, wearing unbranded shoes 124C, or other items. In some examples, the method 100 may identify the item in the media content and receive the item information associated with the identified item. The item information can be received and/or identified by the computer system 108.

In some examples, the computer system may store the item information, metadata, media content, or other information in a data store 126. Information stored in the data store 126 can be accessed and/or analyzed. For example, a particular time that the user interacts with an item in the media content can be analyzed to determine when and/or how many times the user interacted with a particular item. The information can be stored to a profile of the user as well.

The method 100 may provide a notification 130. For example, the notification may include a recommendation or advertisement for one or more items. The item may be offered by an item provider via a network page and/or electronic marketplace. In some examples, the notification can include a link to the item offered through an electronic marketplace (e.g., via a network page that offers the item to the user). The user may select the link to order the item from an item provider and/or electronic marketplace that the user encountered in the media content.

In some examples, the notification may identify a second item. For example, when the identified item in the media content is t-shirt 124A, the second item in the notification can include a similar t-shirt or items that correspond with t-shirt 124A (e.g., jacket, laundry detergent, etc.). The notification can include item information associated with the second item in an electronic marketplace (e.g., to allow the user to order the item).

Figure 2:
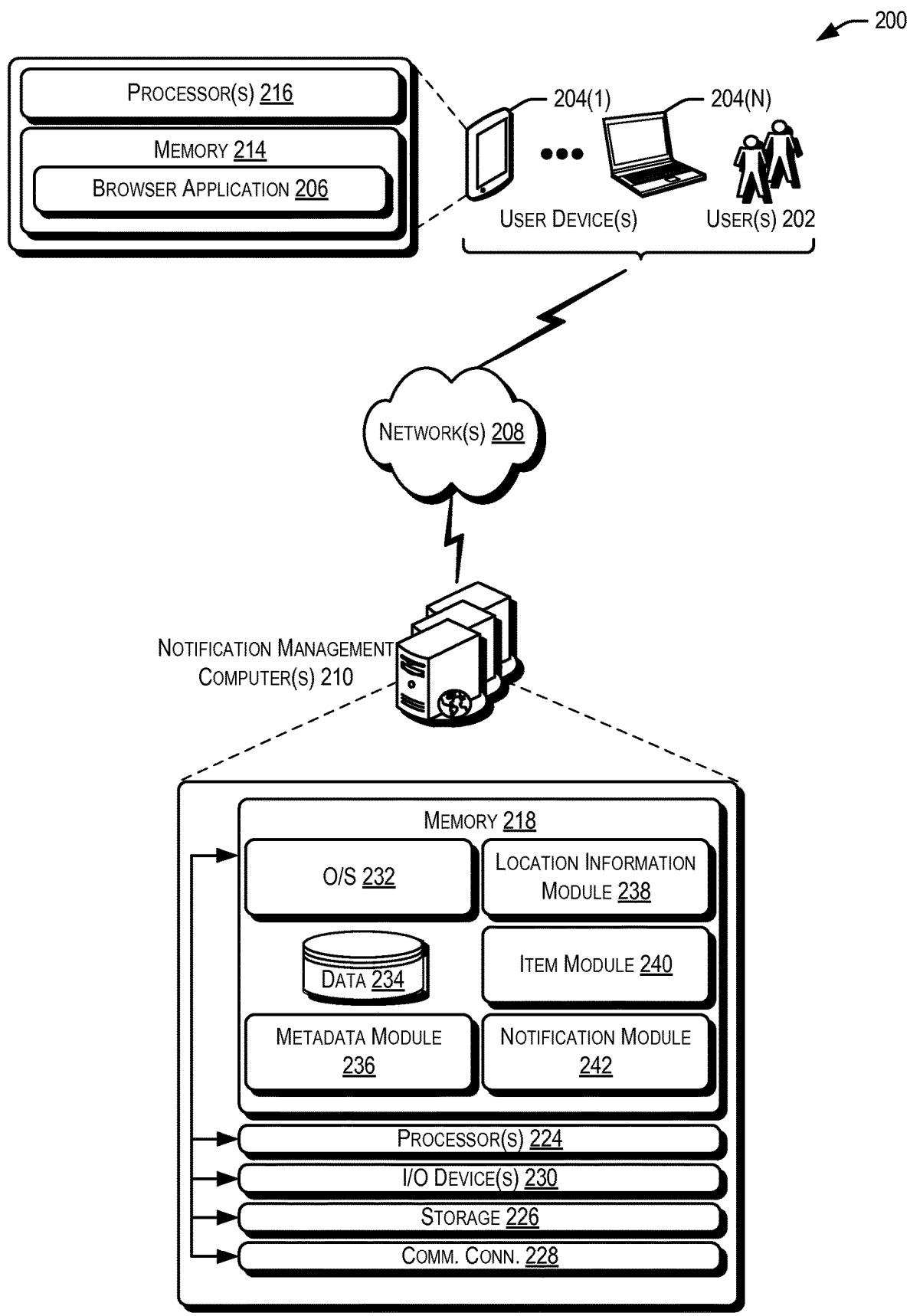
FIG. 2 illustrates an example architecture for providing a notification described herein that includes a notification management computer and/or a user device connected via one or more networks, according to at least one example.

FIG. 2 illustrates an example architecture for providing a notification described herein that includes a notification management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more notification management computers 210. The one or more notification management computers 210 may, in some examples, provide computing resources such as, but not limited to, client entities, low latency data storage, durable data storage, data access, management, virtualization, cloud-based software solutions, electronic content performance management, etc. The one or more notification management computers 210 may also be operable to provide web hosting, computer application development, and/or implementation platforms, combinations of the foregoing, or the like to the one or more users 202. The one or more notification management computers 210, in some examples, may provide electronic notifications to users and/or analyze or receive metadata associated with the media content.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the notification management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

In some examples, the computer system that receives the metadata and/or location information of the user is the same computer system that is operated by the user to access the media content (e.g., the computing device) without use of the network 208. For example, the computer system may receive location information in media content, receive metadata associated with the media content, and provide a notification to the user. In some examples, the computer system may receive metadata associated with the media content without providing the media content and/or metadata over a network 208 (e.g., self-contained software application on a computer system).

As described briefly above, the application 206 may allow the users 202 to interact with a service provider computer, such as to access web content (e.g., web pages, music, video, etc.). The one or more notification management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the notification management computers 210 via the networks 208, or via other network connections. Additionally, the user devices 204 may be part of the distributed system managed by, controlled by, or otherwise part of the notification management computers 210 (e.g., a console device integrated with the notification management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the notification management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the notification management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the notification management computers 210 may be in communication with the user devices 204 and/or other service providers via the networks 208, or via other network connections. The notification management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the notification management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of notification management computers 210, the memory 218 may be volatile (such as RAM) and/or non-volatile (such as ROM, flash memory, etc.). The notification management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the notification management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the notification management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The notification management computers 210 may also contain communications connection(s) 228 that allow the notification management computers 210 to communicate with a stored database, another computing device or server, user terminals and/or other devices on the networks 208. The notification management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a metadata module 236, a location information module 238, an item module 240, and/or a notification module 242. In some examples, the metadata module 236 may be configured to receive metadata associated with media content. Metadata can also include information associated with the user and/or computing device. For example, metadata can include item information for an item included in the media content. In other examples, metadata can include media content information about the media content (e.g., information about the book, magazine, streaming video including title, author, publication date, etc.), items discussed or displayed by the media content (e.g., an item shown in a television show or movie, an item that the main character in a book wears on an adventure, etc.), information contained in at least a portion of a script and/or closed captioning text associated with the media content (e.g., a character in a movie talks about a particular brand of jacket), item information for items associated with topics discussed during conversations, items displayed by a movie, show, video game, etc.

The metadata module 236 may also be configured to identify and/or provide media content to a user operating a computing device. Computing devices can include e-readers, tablets, televisions, handheld devices, personal computers, or other devices known in the art that are operated by users to access the media content. In some examples, the metadata module 236 can be configured to receive an identification of the media content that is provided to the user at the computing device.

The metadata module 236 may also be configured to include item information for one or more items in the media content. For example, the metadata module 236 may interact with other modules (e.g., the item module 240) to identify one or more items in the media content or review media content information to identify the item(s).

The metadata module 236 may also be configured to analyze the media content to dynamically identify metadata. The computer system can dynamically identify metadata for the media content for a variety of instances. For examples, the media content may be received in substantially real time (e.g., streaming video). In some examples, the metadata may not be generated for the media content before the media content is received.

The metadata module 236 can receive the media content and identify the metadata through various methods. The analysis can include parsing the text (e.g., received through media content), voice recognition that is transcribed and analyzed, image analysis, or other methods of analyzing data known in the art. For example, when the media content includes an image frame, the metadata module 236 may be configured to receive a stored image, compare the stored image with the image frame, and determine that a particular item is displayed in the image frame. In another example, when the media content includes verbal communication (e.g., a conversation, dialog in a movie/show, etc.), the metadata module 236 may be configured to receive the verbal communication, parse the communication into recognizable words (e.g., via voice recognition software, via transcribing the communication into text and recognizing the words in the text), and determine that a particular item is associated with the conversation (e.g., spoken, included as a topic discussed during the conversation, etc.).

In some embodiments, the dynamically identified metadata may be stored in a data store. For example, the identification of media content can be received, the metadata may be dynamically identified, and the metadata may be stored in association with the media content.

The memory 218 may also include a location information module 238. The location information module 238 may be configured to identify one or more locations in the media content that the user is interacting with at one or more time(s). For example, the location information module 238 may receive first location information in the media content and second location information in the media content. The first location information can identify a first location in the media content that the user is interacting with at a first time. The second location information can identify a second location in the media content that the user is interacting with at a second time. The first location may be associated with a first item and the second location may be associated with a second item. In some examples, the second time can occur after the first time.

The location information module 238 may also be configured to analyze an interaction between the computing device and media content over time (e.g., between the first time and second time). For example, the analysis may determine that the user accessed Chapter 1 of an electronic book through an e-reader on January $1^{st}$ and Chapter 2 of the same electronic book on January $10^{th}$. In some examples, the analysis can include one or more items that the user encountered during a particular time (e.g., the user interacted with Acme Brand shoes on January $2^{nd}$ at page 10 of the book).

The location information module 238 may also be configured to create or update a profile for the user. The profile may include item information (e.g., associated with a first or second item), media content information, location information, or other information associated with interactions between the media content, computer system, and/or computing device. The profile can include the user's interactions with the media content over time.

The location information module 238 may also be configured to identify a location in the media content that the user is interacting with for streaming or dynamically recognized media content. For example, the location information module can determine that the user is at a particular time of the media content (e.g., because the time is the latest time available in a streaming video).

The memory 218 may also include an item module 240. The item module 240 may be configured to identify item information. The item may be included in the media content and/or metadata associated with the media content. In some examples, the item information is stored in a data store.

The item module 240 may also be configured to receive or identify an item category associated with one or more items. The item category can help identify the type of item. For example, the item category for a smartphone can be one or more of "electronics," "cell phones," "cell phones and accessories," "electronics to trade in," "devices," "housewares," "organizers," all items provided by a particular item provider, or other categories that can help identify the item. In another example, the item category for a vacation package can be one or more of "home and kitchen," all applications provided for a particular device, "all inclusive offers," "everything else," or other categories that can help identify the item. In yet another example, the item category for a song can be one or more of "blues music," "rock and roll music," applications that play music, "music," books based on songs, "MP3 downloads," or other categories that help identify the item.

The item module 240 may also be configured to identify one or more items in the media content. For example, a first item (e.g., Acme Brand shoes) may be identified in the media content. A second item (e.g., Acme Brand car, Beta Brand shoes, etc.) may be identified in a notification corresponding with the notification of the first item. The shared item category between Acme Brand shoes and Acme Brand car may be the brand of the items (e.g., Acme Brand), while the shared item category with Acme Brand shoes and Beta Brand shoes may be the type of item (e.g., shoes).

The item module 240 may also be configured to determine one or more items in an electronic marketplace. For example, the electronic marketplace may provide one or more item providers that provide various items. The item providers can provide the items through one or more network pages or other methods.

The item module 240 may also be configured to search for an item in media content. For example, a user may provide a particular term associated with an item (e.g., "Acme Brand jersey") through a computing device. Metadata associated with the particular term can be searched and, when the item is discovered in the metadata, the media content may be provided to user at the location associated with the particular term (e.g., the particular term is found at 3:00 of the streaming video and the current location is at 15:00, so the media content can be rewound to the 3:00 location). A notification may be provided to the user corresponding with the item (e.g., a notification identifying the portion of the media content where the particular term is found, a recommendation for ordering the Acme Brand jersey, etc.).

The memory 218 may also include a notification module 242. The notification module 242 may be configured to generate a message that includes a recommendation or advertisement associated with an item. For example, the notification can include words to encourage a user to order an item (e.g., "on sale now" or "the main character in your book loves this running shoe"). In another example, the notification can include item information associated with the media content and related to story lines or other information in the media content (e.g., "John explored Seattle on your favorite show last week. Visit Seattle today!").

The notification module 242 may also be configured to provide a notification to a user. For example, the notification may be transmitted to a computing device. The notification can include an image or description of the item on a network page (e.g., the item shown in a list of recommended items in an electronic marketplace). In other examples, the notification may be incorporated with other network pages, software applications (e.g., an unimposing image of the item in the corner of a page of an electronic book), and/or incorporated within the media content.

The notification module 242 may also be configured to provide a notification at a particular time. For example, the notification can be provided to the user after the user interacts with a particular part of the media content. In some examples, the notification can be provided after the user passes a location in the media content at a particular time. In some examples, the notification for the first item may not be provided once the notification for the second item is provided (e.g., stop providing the notification).

The notification module 242 may also be configured to provide more than one notification to a user. For example, a first notification can be provided to a user for a first item and a second notification can be provided to the user for a second item. The items may be associated through a similar item category (e.g., both items are electronics). In another example, the first notification can include item information for a first item at a particular time and the second notification can include item information about the same first item, but provided to the user after the user passes a particular portion of the media content (e.g., after the user interacts with Chapter 3 in the media content).

In some examples, the notification provided to the user may be based on the user's profile. For example, the user may be associated with a particular sports team (e.g., the user receives media content for Acme Brand sports team every week). The notification module 242 may receive information about the Acme Brand sports team and determine that the Acme Brand sports team will be featured in media content within the next week. The notification module 242 may be configured to provide a notification associated with an item in anticipation of the media content (e.g., recommendation to order chips, dip, and beer). In another example, the notification module 242 may determine that the Acme Brand sports team recently lost a game and the notification can recommend an item to cheer up the user (e.g., Beta Brand ice cream).

The notification module 242 may also be configured to provide additional media content in the notification. For example, when the media content is a movie or show, the notification can be provided to the user in the form of a commercial (e.g., a commercial during the movie or show, a commercial at a particular time after the movie or show has ended, etc.).

The notification module 242 may also be configured to determine a frequency for a notification. For example, the notification may be provided to the user more often when the user recently interacted with the item in the media content (e.g., the user sees the item in a movie on January $1^{st}$ and receives three notifications for the item during the week after January $1^{st}$). In another example, the notification may be provided less often for a first item when the user has interacted with other items more recently than the first item.

Figure 3:
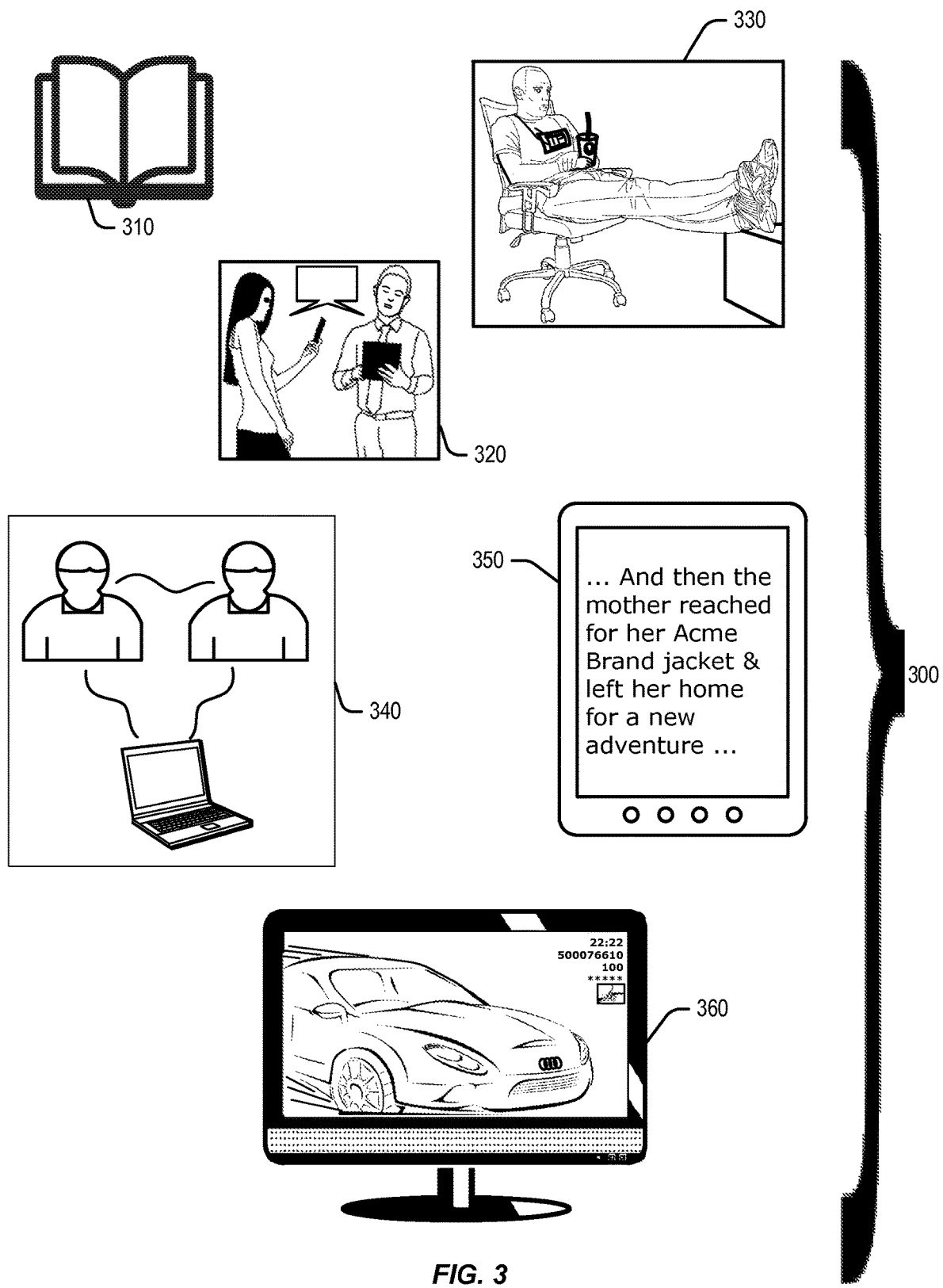
FIG. 3 illustrates example computing devices and/or metadata described herein, according to at least one example.

FIG. 3 illustrates example computing devices and/or metadata described herein, according to at least one example. Computing devices and/or metadata 300 described herein are shown for illustrative purposes and not meant to limit embodiments of the present disclosure.

Media content 310 can include an electronic book. The words, images, characters, story lines, or other information in the electronic book can be used as metadata. For example, the main character in the book may encounter an energy bar in Chapter 3 and the energy bar may be identified as an item in the metadata. The corresponding notification can include the energy bar, clothing worn by the main character, advertisements for vacations to the location where the main character is exploring, and the like.

Media content 320 and 330 may also include a movie, show, or commercial (e.g., a particular scene or portion of the movie or show). For example, two characters may be discussing one or more items during the dialog (e.g., 320). The metadata associated with this example may include the script for the movie or show, closed captioning text, voice recognized dialog, transcribed dialog, or other methods of identifying dialog known in the art. In another example, one or more items can be displayed during the movie or show (e.g., 330) instead of items that are explicitly discussed. The metadata associated with this example may include image recognition, script analysis (e.g., the item is identified in the script), or other methods of identifying images known in the art.

Media content 340 may also include a conversation or captured audio. For example, two users may be discussing an item during a conversation, or the item (e.g., brand, category of an item, etc.) may be discussed during a conversation. A computing device can capture the conversation and analyze the conversation to generate metadata (e.g., a transcript of the conversation, word recognition, optical character recognition (OCR), etc.). In some examples, the metadata associated with the conversation includes item information for items associated with topics discussed during the conversation.

Media content 350 may also include text from an electronic book, magazine, journal, article, etc. provided through a computing device like an e-reader or tablet. For example, a user may operate the computing device to access the media content and encounter one or more items in the text (e.g., the main character can reach for an Acme Brand jacket and leave her home for a new adventure). The notification can include the item from the text or related item (e.g., one or more items that share an item category with the jacket).

Media content 360 may also include a video game and metadata associated with the video game includes one or more items displayed by the video game. For example, the video game may be a racing game that displays one or more items during the game play (e.g., a racing car, a racing track, logos, etc.). The notification can include the item shown in the video game (e.g., jacket worn by the pit crew, etc.) or items associated with the item category (e.g., the racing car is an Acme Brand racing car and the notification includes Acme Brand items for the user to order). In another example, the video game can include a sports game, where a user may choose to play in a role of a Beta Brand sports team. The notification may include recommended items associated with the team (e.g., clothing with the Beta Brand logo), the sports game, the location or setting of the game, or other items included with the metadata associated with the video game.

Figure 4:
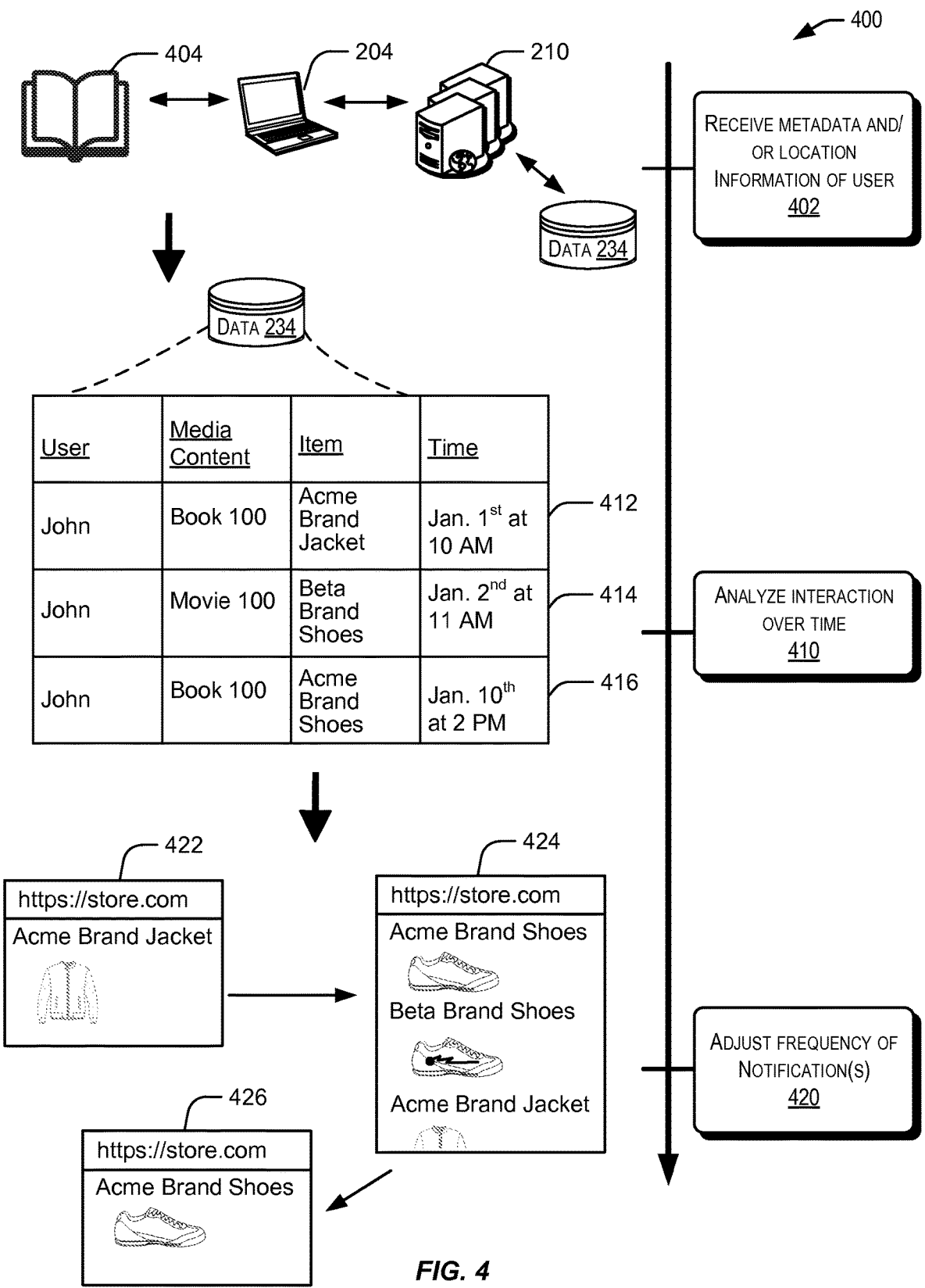
FIG. 4 illustrates an illustrative flow for providing a notification described herein, according to at least one example.

FIG. 4 illustrates an illustrative flow for providing a notification described herein, according to at least one example. In a non-limiting example, the method 400 can receive metadata and/or location information of a user 402. For example, the metadata may include information associated with the media content 404 accessed by the user through a computing device 204. The computing system (e.g., notification management computer 210) can receive the metadata and/or location information of the user. The notification management computer 210 may store the information in the data store 234.

The method 400 may also include analyzing an interaction over time 410. For example, user John can interact with media content (e.g., Book 100, Movie 100, etc.) using the computing device. The information associated with the interactions can be stored in the data store 234. In a first interaction 412, the user can encounter item Acme Brand jacket (e.g., first item) on January $1^{st}$ at 10 AM (e.g., first time) at Chapter 1 (e.g., first location information). In a second interaction 414, the user can encounter item Beta Brand shoes (e.g., second item) on January $2^{nd}$ at 11 AM (e.g., second time) during the first 30 minutes of Movie 100 (e.g., second location information). The second time (e.g., January $2^{nd}$) can occur after the first time (e.g., January $1^{st}$). In a third interaction 416, the user can encounter item Acme Brand shoes (e.g., third item) on January $10^{th}$ at 2 PM (e.g., third time) at Chapter 3 (e.g., third location information).

In some examples, location information can be received for one or more interactions between the user and the media content. The one or more interactions between the user and the media content can be used to update a profile for the user. For example, the profile can contain the first location information that corresponds with a first location in the media content that the user is interacting with at a first time. The second location information can be received and/or stored as well.

The interaction between the computing device and media content can be analyzed. For example, the analysis can include information associated with at least the first time and the second time. The analysis may compare items interacted with at or around the first or second times, the frequency of interacting with those items, the duration of time the user interacted with the items, the time since the user interacted with the item (e.g., the difference between current time and the first/second time), or other analysis.

The method 400 may also include adjusting the frequency of notifications 420. For example, the notification 422 can be provided for the first item (e.g., Acme Brand jacket) on January $1^{st}$ after the user interacts with the item in the media content (e.g., at 2 PM). The second notification may be the same as the first notification. In some examples, the notification 424 can include a recommendation or advertisement for multiple items, including one or more of the items that the user interacted with during a time duration. As shown in notification 424, which may be provided on January $10^{th}$, Acme Brand jacket is provided with less focus than the other item in the notification. Subsequent notifications, like notification 426, can provide a notification for Acme Brand shoes more often than the Acme Brand jacket (e.g., because the user interacted with Acme Brand shoes on January $10^{th}$ and Acme Brand jacket on January $1^{st}$).

Figure 5:
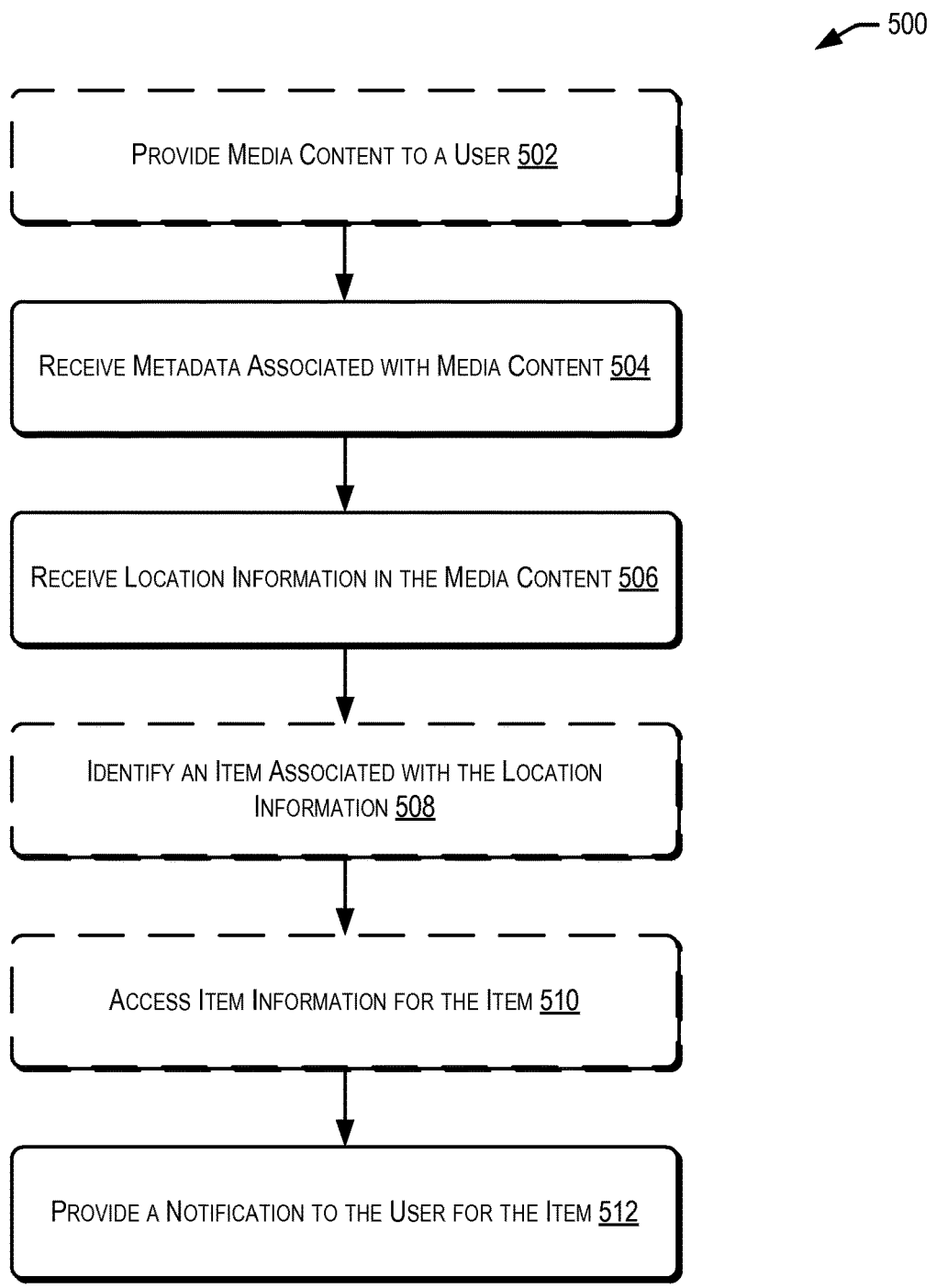
FIG. 5 illustrates an example flow diagram for providing a notification described herein, according to at least one example.

FIG. 5 illustrates an example flow diagram for providing a notification described herein, according to at least one example. In some examples, the one or more notification management computers 210 (e.g., utilizing at least one of the metadata module 236, the location information module 238, the item module 240, and/or the notification module 242) or one or more user devices 204 shown in FIG. 2 may perform the process 500 of FIG. 5. The process 500 may optionally begin at 502 by providing media content to a user. For example, the media content can be provided to a user operating a computing device. The computing device may be used to access the media content. At 504, the process 500 may include receiving metadata associated with the media content. For example, the metadata can include item information for an item included in the media content. In some examples, one or more items included in the media content can include one or more item categories. At 506, the process 500 may include receiving location information in the media content. For example, the location information can identify a location in the media content that the user is interacting with at a particular time. At 508, the process 500 may optionally include identifying an item with the location information. For example, the item may be described or shown in the media content. At 510, the process 500 may optionally include accessing item information for the item. For example, accessing item information can include the item information associated with providing the item in an electronic marketplace. Further in some examples, the process 500 may end at 512, where the process 500 may include providing a notification to the user for the item. For example, the notification can include a recommendation or advertisement for the item in the electronic marketplace. In another example, the notification can include a recommendation or advertisement associated with an item in the item category.

Figure 6:
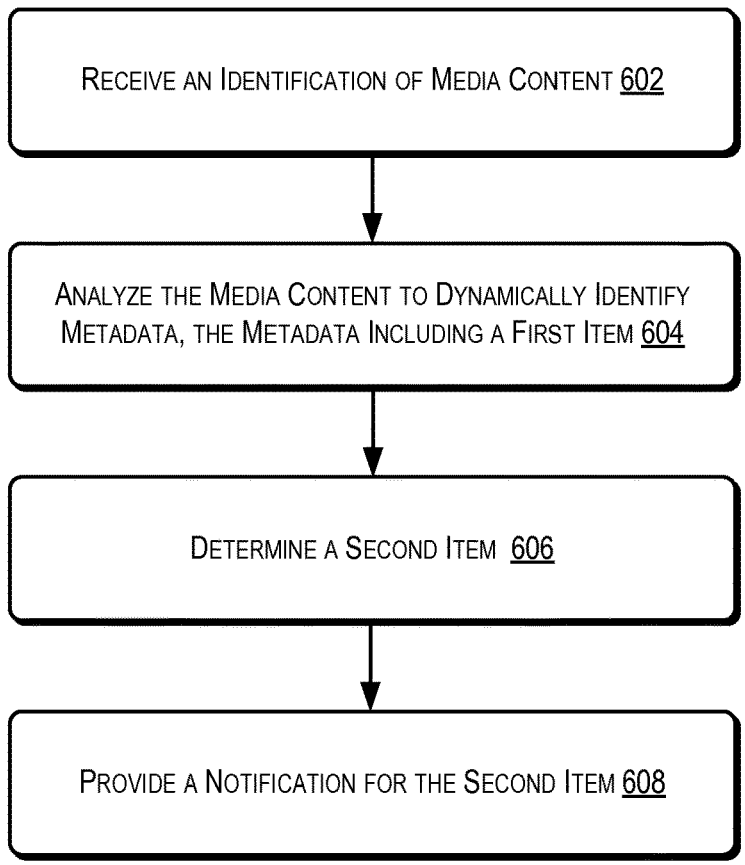
FIG. 6 illustrates an example flow diagram for providing a notification described herein, according to at least one example.

FIG. 6 illustrates an example flow diagram for providing a notification described herein, according to at least one example. In some examples, the one or more notification management computers 210 (e.g., utilizing at least one of the metadata module 236, the location information module 238, the item module 240, and/or the notification module 242) or one or more user devices 204 shown in FIG. 2 may perform the process 600 of FIG. 6. The process 600 may begin at 602 by receiving an identification of media content. For example, the media content can be provided to a user at a computing device. At 604, the process 600 may include analyzing the media content to dynamically identify metadata. The metadata may include a first item. At 606, the process 600 may include determining a second item. For example, the second item may be in an electronic marketplace. In some examples, the second item may be associated with the first item. Further in some examples, the process 600 may end at 608, where the process 600 may include providing a notification for the second item. For example, the notification can include a recommendation or advertisement for the second item offered by an item provider associated with the electronic marketplace.

Illustrative methods and systems for providing image analysis/management are described above. Some or all of these systems and methods may, but need not, be implemented at least partially by architectures such as those shown at least in FIGS. 1-6 above.

Figure 7:
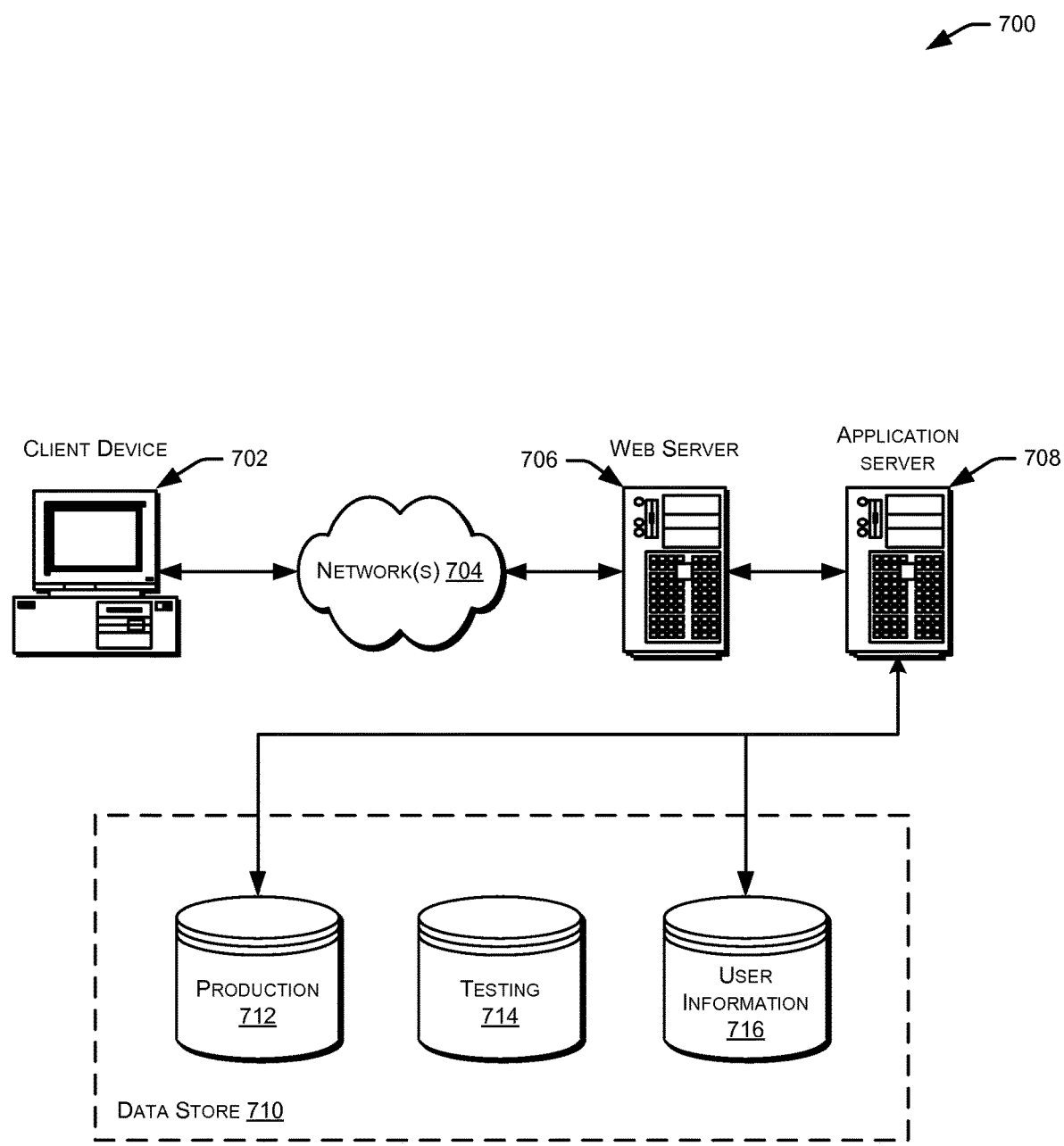
FIG. 7 illustrates an environment in which various embodiments of providing a notification described herein can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl®, Python® or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method performed by a computer system, comprising:
    sending, by the computer system over a data network, media content to a user operating an e-reader computing device, the e-reader computing device used to present the media content at a graphical user interface of the e-reader computing device;
    receiving, by the computer system, metadata of the media content, the metadata including item information for a first item included in the media content, the metadata further including a page number indicating a location of the first item in the media content;
    receiving, by the computer system from the e-reader computing device over the data network and based at least in part on a first user interaction with the first item at a first time via the graphical user interface of the e-reader computing device, location information in the media content associated with the first user interaction at the e-reader computing device, the location information identifying a first location of the first item in the media content at the first time;
    determining, by the computer system, that the first location in the media content includes at least the page number;
    updating, by the computer system based at least in part on the item information, a data store that stores a profile of the user, the updating comprising adding a first association of the first item with the first time and the first location to the profile;
    sending, by the computer system based at least in part on a first notification frequency, a first notification for the first item, the first notification including a recommendation or advertisement for the first item in an electronic marketplace, and the first notification being sent over the data network to a different computing device than the e-reader computing device;
    receiving, by the computer system from the e-reader computing device over the data network and based at least in part on a second user interaction with a second location of a second item via the graphical user interface of the e-reader computing device, data indicating the second user interaction, the second user interaction occurring after the first notification is provided and at a second time;
    sending, by the computer system over the data network, a second notification at a second notification frequency for the second item, the second notification including a second recommendation or advertisement for the second item in the electronic marketplace, and the second notification being sent to the different computing device than the e-reader computing device;
    receiving, by the computer system from the e-reader computing device over the data network and based at least in part on a third user interaction with the first item at a third time after the second time via the graphical user interface of the e-reader computing device, third location information in the media content, the third location information identifying a third location of the first item in the media content at the third time;
    updating, by the computer system, the data store by adding a second association of the first item with the third time and the third location to the profile;
    computing, by the computer system, a first interaction frequency of the user with the media content for the first item based at least in part on the first association and the second association;
    increasing, by the computer system, the first notification frequency of the first item based at least in part on multiple interactions via the e-reader computing device with the first item in the media content and on a second interaction frequency of the user with the media content for the second item via the graphical user interface of the e-reader computing device being smaller than the first interaction frequency: and
    stopping, by the computer system, the second notification frequency when the first notification frequency is increased.

2. The computer-implemented method of claim 1, wherein the media content is an electronic book, magazine, journal, or article.

3. The computer-implemented method of claim 1, wherein the first notification frequency is a frequency for providing the user with notifications associated with one or more items so that the computer system is configured to provide the notifications based at least in part on the first notification frequency.

4. The computer-implemented method of claim 1, wherein the metadata associated with the media content corresponds with the first location.

5. The computer-implemented method of claim 1, wherein the user profile further includes a duration of time that the user interacts with the first location in the media content.

6. The computer-implemented method of claim 1, wherein the first item is available for ordering from an electronic marketplace associated with the computer system.

7. A computer-implemented method performed by a computer system, comprising:
    receiving, by the computer system from an e-reader computing device over a data network and based at least in part on a user interaction with a first item in media content via a graphical user interface of the e-reader computing device, location information in the media content presented in the graphical user interface by the e-reader computing device operated by a user, the location information in the media content identifying a first location of the first item in the media content at a first time;

receiving, by the computer system, metadata associated with the media content, the metadata including item information for the first item included in the media content, the metadata further including a page number indicating a location of the first item in the media content presented in the graphical user interface;

determining, by the computer system, that the first location in the media content includes at least the page number;

updating, by the computer system based at least in part on the item information, a data store that stores a profile of the user, the updating comprising adding a first association of the first item with the first time and the first location to the profile;

providing, by the computer system based at least in part on a first notification frequency, a first notification to the user, the first notification including a recommendation or advertisement associated with an item in an item category of the first item, and the first notification being provided over the data network to a different computing device than the e-reader computing device;

receiving, by the computer system from the e-reader computing device over the data network, data indicating a second user interaction with a second location of a second item via the graphical user interface, the second user interaction occurring after the first notification is provided and at a second time;

providing, by the computer system over the data network, a second notification at a second notification frequency to the user at the e-reader computing device for the second item;

receiving, by the computer system from the e-reader computing device over the data network and based at least in part on a third user interaction with the first item at a third time after the second time via the graphical user interface, third location information in the media content, the third location information identifying a third location of the first item in the media content at the third time;

updating, by the computer system, the data store by adding a second association of the first item with the third time and the third location to the profile;

computing, by the computer system, a first interaction frequency of the user with the media content for the first item based at least in part on the first association and the second association;

increasing, by the computer system, the first notification frequency of the first item based at least in part on multiple interactions via the e-reader computing device with the first item in the media content and on a second interaction frequency of the user with the media content for the second item via the graphical user interface being smaller than the first interaction frequency; and stopping, by the computer system, the second notification frequency when the first notification frequency is increased.

8. The computer-implemented method of claim 7, wherein the first notification is provided after the user passes the first location in the media content identified with the metadata.

9. The computer-implemented method of claim 7, wherein the first notification is provided to the user after the user interacts with the media content identified at the first location.

10. The computer-implemented method of claim 7, wherein the media content comprises at least one of text or an image.

11. The computer-implemented method of claim 7, wherein the first notification is provided through a network page accessed by the different computing device operated by the user.

12. The computer-implemented method of claim 7, wherein the computer system is operated by the user to access the media content.

13. A system, comprising:
a memory that stores computer-executable instructions; and
a processor configured to access the memory and execute the computer-executable instructions, wherein the execution of the computer-executable instructions cause the system to:
receive metadata associated with media content accessed by an e-reader computing device, the metadata including item information for a first item and a second item included in the media content and presented via a graphical user interface of the e-reader computing device, and the metadata further including a page number indicating a location of the first item in the media content;
receive, from the e-reader computing device over a data network and based at least in part on a first user interaction with the first item in the media content at a first time via the graphical user interface, first location information in the media content associated with the first user interaction at the e-reader computing device;
determine that the first location in the media content includes at least the page number;
receive, from the e-reader computing device over a data network and based at least in part on a second user interaction with the second item in the media content at a second time via the graphical user interface, second location information in the media content associated with the second user interaction at the e-reader computing device, the second time occurring after the first time;
provide a first notification at a first notification frequency, the first notification being provided to a different computing device than the e-reader computing device;
provide a second notification at a second notification frequency, the second notification being provided to the different computing device than the e-reader computing device;
receive, from the e-reader computing device over a data network and based at least in part on a third user interaction with the first item in the media content at a third time via the graphical user interface, third location information in the media content, the third location information identifying a third location of the first item in the media content at the third time, the third time occurring after the second time;
update, based at least in part on the item information, a data store by at least adding a first association of the first item with the first time and the first location and a second association of the second item with the second time and the second location;

compute a first interaction frequency with the media content for the first item based at least in part on the first association and the second association;

increase the first notification frequency of the first item based at least in part on multiple interactions via the e-reader computing device with the first item in the media content via the graphical user interface and on a second interaction frequency of the user with the media content for the second item being smaller than the first interaction frequency: and stop the second notification frequency for providing the second notification associated with second item when the first notification frequency is increased.

14. The system of claim 13, wherein the execution of the computer-executable instructions further cause the system to:

update a profile that includes the first item and the second item in the media content.

15. The system of claim 13, wherein the first notification is provided to the user after the user interacts with the media content identified at the first location.

16. The system of claim 13, wherein the execution of the computer-executable instructions further cause the system to:

provide the second notification for the second item additionally within the media content.

* * * * *